United States Patent
Dingman et al.

(10) Patent No.: US 7,152,914 B2
(45) Date of Patent: Dec. 26, 2006

(54) VEHICLE CENTER PILLAR STRUCTURE

(75) Inventors: Mark T. Dingman, Royal Oak, MI (US); Terry A. Swartzell, Ann Arbor, MI (US); James Jenying Wang, Troy, MI (US); Amit Sharma, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 100 days.

(21) Appl. No.: 11/085,799

(22) Filed: Mar. 21, 2005

(65) Prior Publication Data

US 2006/0208537 A1    Sep. 21, 2006

(51) Int. Cl.
*B60J 7/00* (2006.01)
(52) U.S. Cl. .............................. 296/193.05; 296/203.03
(58) Field of Classification Search ........... 296/193.05, 296/193.06, 193.01, 202, 203.03
See application file for complete search history.

(56) References Cited

U.S. PATENT DOCUMENTS

| | | | | |
|---|---|---|---|---|
| 5,560,672 A | * | 10/1996 | Lim et al. ............... | 296/203.01 |
| 5,785,378 A | * | 7/1998 | Seefried et al. ........ | 296/193.05 |
| 5,810,428 A | * | 9/1998 | Maki ..................... | 296/193.06 |
| 6,073,992 A | * | 6/2000 | Yamauchi et al. ..... | 296/203.01 |
| 6,325,450 B1 | * | 12/2001 | Sakyo et al. ........... | 296/190.08 |
| 6,692,065 B1 | * | 2/2004 | Yamamoto et al. .... | 296/203.03 |
| 6,976,730 B1 | * | 12/2005 | Mally et al. ........... | 296/203.03 |
| 6,983,981 B1 | * | 1/2006 | Saeki ..................... | 296/203.03 |
| 7,070,228 B1 | * | 7/2006 | Shimizu et al. ........ | 296/193.06 |
| 2002/0033618 A1 | * | 3/2002 | Kwon .................... | 296/203.03 |
| 2003/0160476 A1 | * | 8/2003 | Moriyama ................. | 296/202 |
| 2005/0134091 A1 | * | 6/2005 | Rashidy et al. ........ | 296/203.01 |
| 2005/0189790 A1 | * | 9/2005 | Chernoff et al. ....... | 296/193.05 |

* cited by examiner

*Primary Examiner*—Kiran B. Patel
(74) *Attorney, Agent, or Firm*—Laura C. Hargitt

(57) ABSTRACT

A vehicle body includes a center pillar structure including an outer reinforcement having an outer wall and two side walls defining a channel. Two reinforcements are located within the channel, each rigidly interconnecting the outer wall with a respective one of the sidewalls. A tension panel preferably interconnects the two sidewalls. The center pillar structure is characterized by continuity of strength along its height and increased resistance to vertical compressive loads.

7 Claims, 2 Drawing Sheets

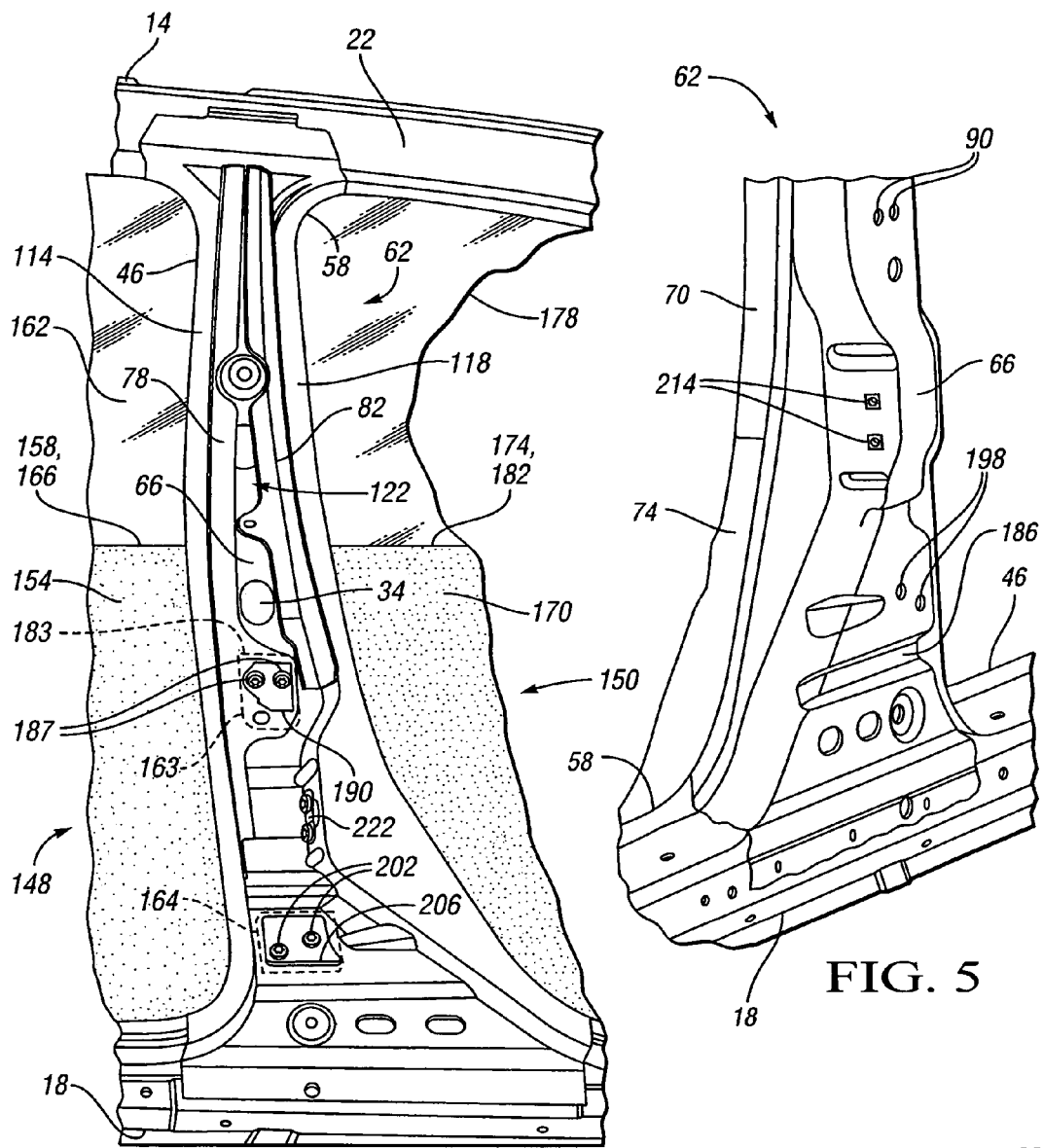
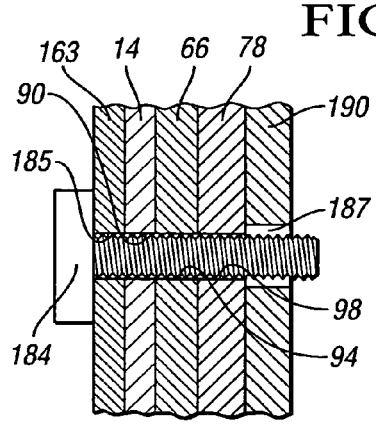
FIG. 4
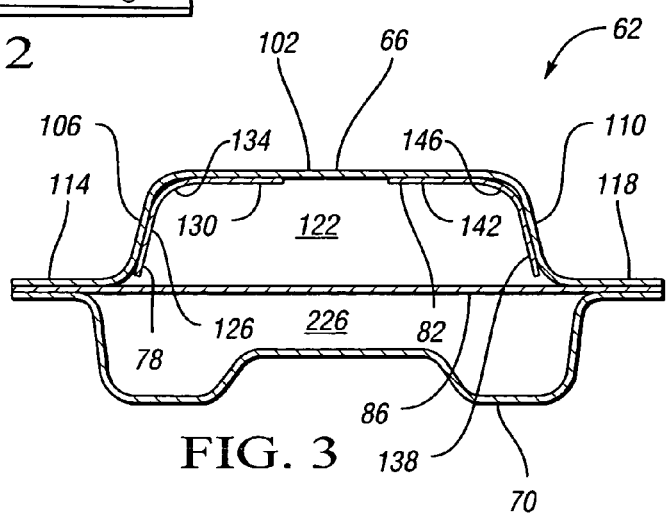

VEHICLE CENTER PILLAR STRUCTURE

TECHNICAL FIELD

This invention relates to vehicle center pillar structures.

BACKGROUND OF THE INVENTION

Passenger vehicles often include a center pillar, also sometimes referred to as a "B pillar," between front and rear door openings. The center pillar typically extends from a floor pan and rocker panel upward to a vehicle roof. The center pillar typically supports a striker that engages a latch on a front door to releasably maintain the front door in a closed position. The center pillar also typically supports hinges that are pivotably connected to a rear door. Thus, the center pillar provides support for front and rear side doors as well as for the vehicle roof. Furthermore, the center pillar may be subjected to impact loads exerted on the doors in a vehicle side-impact scenario.

The cross-sectional geometry of a typical center pillar is smaller above the beltline of the doors than below, in part to minimize obstruction of the view through the door windows. Further, the rear door causes strengthening of the center pillar structure between the upper and lower hinges; that is, the rear door structure reinforces the center pillar between its attachment points to the center pillar.

SUMMARY OF THE INVENTION

A vehicle center pillar structure is provided. The center pillar structure includes a bodyside outer panel that at least partially defines a front door opening and a rear door opening. The bodyside outer panel includes a center pillar portion that is between the front door opening and the rear door opening. A center pillar outer reinforcement is aligned with the center pillar portion of the bodyside outer panel and includes an outer wall and two sidewalls extending inboard from the outer wall. The outer wall and the two sidewalls cooperate to define a channel. A first channel reinforcement is positioned within the channel and is connected to both the outer wall and one of the two sidewalls. A second channel reinforcement is positioned within the channel and is connected to both the outer wall and the other of the two sidewalls.

In a preferred embodiment, one of the channel reinforcements extends below at least a portion of the upper rear door hinge such that the rear door strength is integrated with the reinforcement.

In an exemplary embodiment, the center pillar structure also includes a tension panel that is operatively connected with respect to the two sidewalls to at least partially close the channel. The tension panel thus provides a closed cross section of the outer reinforcement. The tension panel cooperates with the channel reinforcements to maintain the cross-sectional geometry of the center pillar structure when subjected to a vertical load through the vehicle roof.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic side view of a portion of the center pillar structure of FIG. 1;

FIG. 3 is a schematic cross-sectional view of the center pillar structure of FIG. 1 taken along a horizontal plane above a door beltline;

FIG. 4 is a schematic cross-sectional view taken along a vertical place of a portion of the center pillar structure of FIGS. 1 and 2 and a hinge; and FIG. 5 is a schematic, perspective, partial cutaway view of the outboard side of the center pillar structure.

DESCRIPTION OF THE PREFERRED EMBODIMENTS

Figure 1:
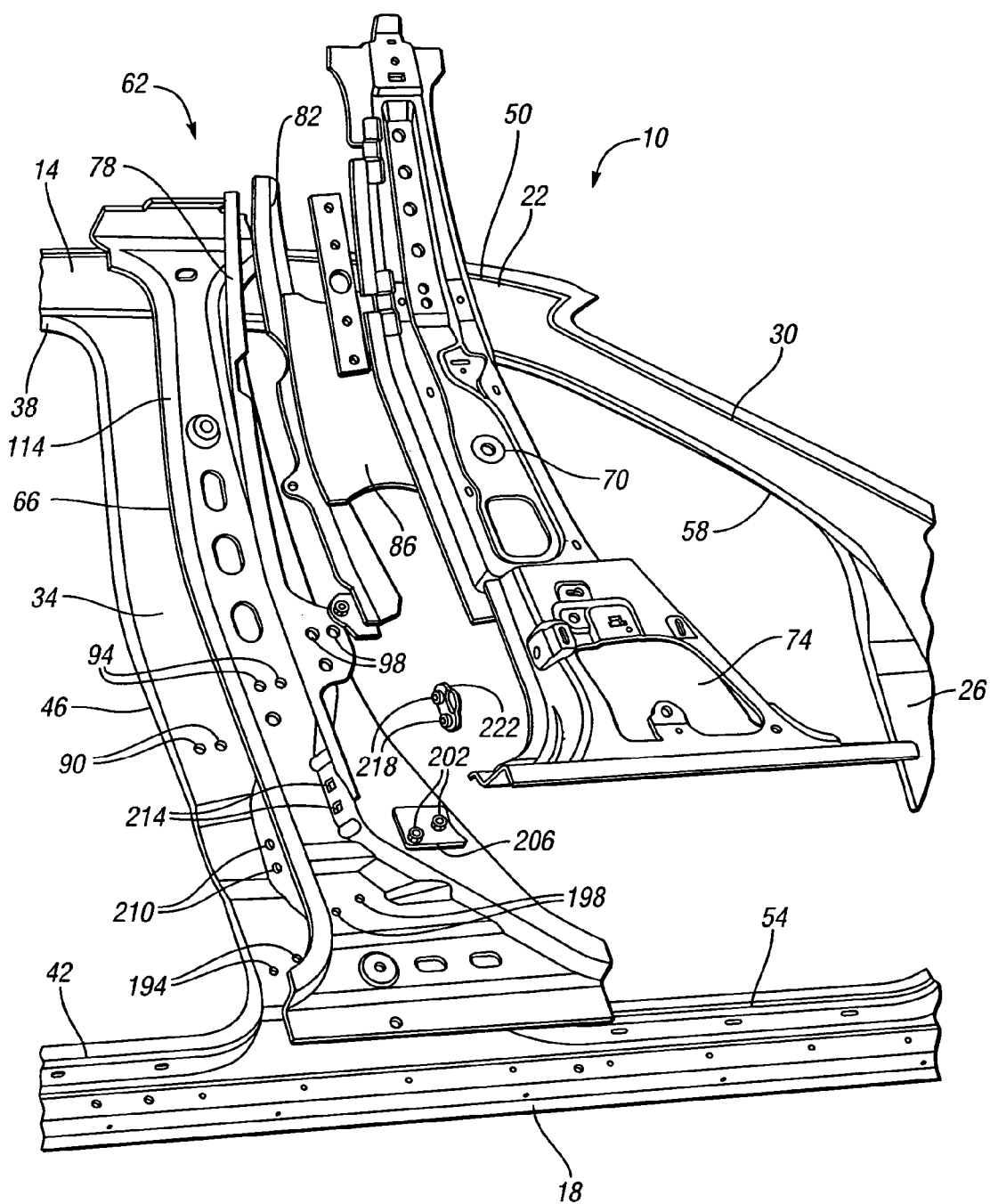
FIG. 1 is a schematic, expanded, perspective view of a center pillar structure in accordance with the claimed invention.

Referring to FIG. 1, an expanded vehicle body side structure 10 is schematically depicted. The side structure 10 includes a bodyside outer panel 14 that includes a lower 18, an upper portion 22, a front hinge pillar portion 26, an A-pillar portion 30, and a center pillar portion 34 that extends generally vertically to interconnect the lower portion 18 and the upper portion 22. A portion 38 of the upper portion 22 and a portion 42 of the lower portion 18 cooperate with the center pillar portion 34 to partially define a rear door opening 46. A portion 50 of the upper 22, a portion 54 of the lower portion 18, the A-pillar portion 30, and the front hinge pillar portion 26 cooperate with the center pillar portion 34 to define a front door opening 58.

A center pillar structure 62 includes the center pillar portion 34 of the bodyside outer panel 14, a center pillar outer reinforcement 66, an upper inner panel 70, a lower inner panel 74, a first channel reinforcement 78, a second channel reinforcement 82, and a tension panel 86.

The center pillar portion 34 of the bodyside outer panel 14 defines two holes 90. The outer reinforcement 66 defines two holes 94, and the first channel reinforcement 78 defines two holes 98. Referring to FIGS. 1 and 2, the outer reinforcement 66 is connected to the center pillar portion 34 such as by welding such that holes 94 align with holes 90. The first and second channel reinforcements 78, 82 are connected to the outer reinforcement 66 such as by welding. The holes 98 in the first channel reinforcement 78 align with holes 90, 94.

Referring to FIG. 3, wherein like reference numbers refer to like components from FIGS. 1 and 2, the outer reinforcement 66 includes an outer wall 102 that abuts the center pillar portion of the bodyside panel (not shown in FIG. 3). The outer reinforcement 66 defines a first sidewall 106 that extends inboard from the outer wall 102. The outer reinforcement 66 also defines a second sidewall 110 that is spaced a distance apart from the first sidewall 106 and that extends inboard from the outer wall 102. Flanges 114, 118 extend from respective sidewalls 106, 110. The outer wall 102, the first sidewall 106, and the second sidewall 110 cooperate to define a channel 122.

The first channel reinforcement 78 is characterized by two segments 126, 130 separated by a curved segment 134. Segment 126 is rigidly connected to sidewall 106 such as by welding. Segment 130 is rigidly connected to the outer wall 102 such as by welding. Thus, the first channel reinforcement 78 sufficiently interconnects the outer wall 102 and the sidewall 106 to transfer loads therebetween irrespective of load vector. Similarly, the second channel reinforcement 82 has two segments 138, 142 separated by a curved segment 146. Segment 138 is rigidly connected to sidewall 110 such as by welding. Segment 142 is rigidly connected to outer wall 102 such as by welding. Thus, the second channel reinforcement 82 sufficiently interconnects the outer wall 102 and the sidewall 110 to transfer loads therebetween irrespective of load vector.

The channel reinforcements 78, 82 are preferably formed of ultra high strength steel, and thus have a significantly higher strength than the outer reinforcement 66. Referring again to FIG. 2, the vehicle includes a rear door assembly 148 and a front door assembly 150. The rear door assembly 148 includes an inner panel 154 that at least partially defines a window opening 158 through which rear door window 162 extends. The inner panel 154 is connected to the center pillar structure 62 by an upper hinge 163 and a lower hinge 164. The rear door assembly 148 is characterized by a beltline 166 which corresponds to the lower extent of the window opening 158. The front door assembly 150 includes an inner panel 170 that at least partially defines a window opening 174 through which front door window 178 extends. The front door assembly 150 is characterized by a beltline 182 which corresponds to the lower extent of the window opening 174. The front door assembly 150 is connected to the front hinge pillar portion, shown at 26 in FIG. 1, via hinges (not shown). Beltline 182 and beltline 166 are at substantially the same vertical height.

The channel reinforcements 78, 82 extend from above the beltlines 166, 182, at the upper portion 22 of the bodyside outer panel 14 near the vehicle roof (not shown), to below the beltlines 166, 182. In the embodiment depicted, the first channel reinforcement 78 extends below, i.e., lower than, the upper extent 183 of the upper rear door hinge 163 to integrate the strength of the rear door assembly 148 with the above-belt first channel reinforcement 78. Referring to FIGS. 2 and 4, the upper rear door hinge 163 is mounted to the outboard side of the bodyside outer panel 14 with threaded fasteners such as bolts 184 that extend through respective holes 185 formed in the upper hinge 163, holes 90 formed in the bodyside outer panel 14, holes 94 formed in the outer reinforcement 66, holes 98 formed in the first channel reinforcement 78, and nuts 187 in nut plate 190. Thus, the first channel reinforcement 78 in the embodiment depicted extends sufficiently downward to be part of the "metal stack" at which the hinge 163 is mounted to the center pillar structure 62.

Referring to FIGS. 1 and 2, lower rear door hinge 164 is mounted to the outboard surface of the bodyside outer panel 14 with mechanical fasteners through holes 194 in the bodyside outer panel 14, holes 198 in the outer reinforcement 66, and through nuts 202 in nut plate 206.

The striker (not shown) for engagement with the latch (not shown) of the front door assembly 150 is mounted to the center pillar structure 62 with mechanical fasteners that extend through holes 210 in the bodyside outer panel 14, holes 214 in the outer reinforcement 66, and through nuts 218 in nut plate 222.

Referring again to FIG. 3, tension panel 86 is rigidly connected to flanges 114, 118, such as by welding, to extend across the open end of channel 122 and thereby close a portion of channel 122. The upper inner panel 70 defines channel 226 and is welded to the tension panel 86 adjacent flanges 114, 118 so that tension panel 86 is between the upper inner panel 70 and the outer reinforcement 66 and separates channels 122, 226. In the embodiment depicted, the tension panel 86 is positioned to extend from below beltlines 166, 182 to above beltlines 166, 182, but the optimal height at which the tension panel 86 is mounted may vary with vehicle characteristics such as center pillar size, center pillar discontinuities, the curvature of the center pillar (i.e., tumblehome), etc.

The tension panel 86 stabilizes the cross sectional geometry of the center pillar structure 62 in the event of a vertical load exerted through the vehicle roof. More particularly, the tension panel 86 in cross section extends substantially linearly from flange 114 to flange 118. When the center pillar structure 62 is subjected to a vertical compressive load, the tension panel 86 resists flattening of the cross sectional geometry of the center pillar structure 62 by resisting separation of the flanges 114, 118, whereby the tension panel 86 is subjected to a tensile load. The tension panel 86 thus prevents rotation of the channel reinforcements 78, 82 so that their strength is engaged in resisting deformation of the center pillar structure 62.

Referring to FIG. 5, wherein like reference numbers refer to like components from FIGS. 1–4, the outboard side of the center pillar structure 62 is schematically depicted with a portion of the center pillar portion 34 of the bodyside outer panel 14 removed. The outer reinforcement 66 defines an engineered strength discontinuity such as groove 186. Groove 186 is located below the lower rear door hinge and functions to provide deformation initiation near the base of the center pillar structure 62 in the event of a horizontal load exerted on the vehicle.

Referring again to FIG. 1, in an exemplary embodiment, the upper inner panel 70 has a thickness of approximately 1.6 millimeters and is formed of DP800 material (i.e., dual phase steel having an ultimate strength of 780 MPa); the tension panel 86 has a thickness of approximately 0.8 millimeters and has a yield strength of approximately 340 MPa; the channel reinforcements 78, 82 have a thickness of approximately 1.5 millimeters and are formed of DP1000 material (i.e., dual phase steel having an ultimate strength of 980 MPa); and the outer reinforcement 66 has a thickness of approximately 1.8 millimeters and has a yield strength of approximately 210 MPa.

While the best modes for carrying out the invention have been described in detail, those familiar with the art to which this invention relates will recognize various alternative designs and embodiments for practicing the invention within the scope of the appended claims.

The invention claimed is:

1. A vehicle body comprising:
   a center pillar structure including
      a bodyside outer panel having a center pillar portion at least partially defining a front door opening and a rear door opening,
      a center pillar outer reinforcement operatively connected to the center pillar portion and having an outer wall, a first sidewall extending inboard from the outer wall, and a second sidewall extending inboard from the outer wall, wherein the outer wall and first and second sidewalls define a channel,
      a first channel reinforcement located inside the channel and rigidly interconnecting the first sidewall and the outer wall, and
      a second channel reinforcement located inside the channel and rigidly interconnecting the second sidewall and the outer wall;
   a door assembly defining a window opening characterized by a lower extent; and
   at least one hinge operatively interconnecting the door assembly and the center pillar structure;

wherein said first and second channel reinforcement extend above and below the lower extent of the window opening.

2. The vehicle body of claim 1, wherein said first channel reinforcement extends below said at least one hinge.

3. The vehicle body of claim 1, wherein said center pillar outer reinforcement includes a first flange extending from said first sidewall, and a second flange extending from said second sidewall; and wherein the vehicle body further comprises a tension panel operatively connected to said first and second flanges.

4. The vehicle body of claim 3, wherein said tension panel extends above and below the lower extent of the window opening.

5. The vehicle body of claim 1, wherein the center pillar outer reinforcement defines a deformation-initiation feature below the first and second channel reinforcements.

6. The vehicle body of claim 5, wherein said deformation-initiation feature is a groove.

7. The vehicle body of claim 1, wherein said first and second channel reinforcement members comprise a material having a first strength; and wherein said center pillar outer reinforcement comprises a material having a second strength less than the first strength.

\* \* \* \* \*